(12) United States Patent
Buchwitz et al.

(10) Patent No.: US 10,613,111 B2
(45) Date of Patent: Apr. 7, 2020

(54) WHEEL-SPEED TONE RING APPARATUS

(71) Applicant: Ford Global Technologies, LLC, Dearborn, MI (US)

(72) Inventors: Joe L. Buchwitz, Huntington Woods, MI (US); John Wesley Stanley, Belleville, MI (US); Mark Riches, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/723,799

(22) Filed: Oct. 3, 2017

(65) Prior Publication Data

US 2019/0101565 A1    Apr. 4, 2019

(51) Int. Cl.
| | | |
|---|---|---|
| *G01P 3/488* | (2006.01) | |
| *G01P 3/481* | (2006.01) | |
| *B60T 8/32* | (2006.01) | |
| *B62D 7/18* | (2006.01) | |

(52) U.S. Cl.
CPC .............. *G01P 3/488* (2013.01); *G01P 3/481* (2013.01); *B60T 8/329* (2013.01); *B60Y 2400/3032* (2013.01); *B62D 7/18* (2013.01)

(58) Field of Classification Search
CPC ...... B60T 8/329; B60T 8/171; B60T 2240/00; B60T 2250/04; B60T 8/172; B60T 8/00; B60T 8/17; B60T 8/54; G01P 3/488; G01P 3/487; G01P 1/026; G01P 13/04; G01P 3/48; G01P 3/44; G01P 1/02; G01P 3/481; G01D 5/147; G01D 5/14; B60Y 2400/3032; B62D 7/18
See application file for complete search history.

(56) References Cited

U.S. PATENT DOCUMENTS

| | | | |
|---|---|---|---|
| 4,864,231 A | | 9/1989 | Okumura et al. |
| 5,184,069 A | * | 2/1993 | Adler ...................... G01P 3/443 |
| | | | 324/174 |
| 5,613,744 A | * | 3/1997 | Eslinger .................. B60T 8/175 |
| | | | 303/113.2 |
| 5,850,141 A | * | 12/1998 | Adler ...................... G01P 3/443 |
| | | | 324/174 |
| 6,498,475 B2 | | 12/2002 | Foster et al. |
| 6,830,250 B2 | * | 12/2004 | Cervantez ........ B60G 17/01933 |
| | | | 180/209 |
| 7,108,427 B2 | | 9/2006 | Joki et al. |
| 7,306,293 B2 | * | 12/2007 | Redgrave ................ B60T 8/329 |
| | | | 303/20 |
| 8,020,676 B2 | * | 9/2011 | Bradley .................. F16D 66/00 |
| | | | 188/18 A |

(Continued)

FOREIGN PATENT DOCUMENTS

| | | |
|---|---|---|
| GB | 2388431 | 11/2003 |
| IN | 5950/CHE/2013 | 6/2016 |

*Primary Examiner* — Vinh P Nguyen
(74) *Attorney, Agent, or Firm* — Ray Coppiellie; Hanley, Flight & Zimmerman, LLC (57) ABSTRACT

Example apparatus are disclosed for a wheel-speed tone ring apparatus. An example apparatus includes an axle of a vehicle, and a tone ring coupled to the axle, the tone ring having teeth distributed about a peripheral edge of the tone ring, each tooth having a ramp-shaped surface to be sensed by a wheel speed sensor as the tone ring rotates with the axle.

20 Claims, 7 Drawing Sheets

(56) References Cited

U.S. PATENT DOCUMENTS

| | | | |
|---|---|---|---|
| 8,167,762 B2* | 5/2012 | Zink | B60T 8/171 |
| | | | 475/230 |
| 10,473,678 B2* | 11/2019 | Gangwar | G01D 5/30 |
| 2003/0085697 A1* | 5/2003 | Dobbs | G01P 3/443 |
| | | | 324/173 |
| 2017/0108526 A1 | 4/2017 | Boldt et al. | |
| 2018/0313417 A1* | 11/2018 | White | B60T 8/00 |

* cited by examiner

1
WHEEL-SPEED TONE RING APPARATUS

FIELD OF THE DISCLOSURE

This disclosure relates generally to vehicles and, more particularly, to wheel-speed tone ring apparatus.

BACKGROUND

Many vehicles, such as automobiles and trucks, include an anti-lock brake system (ABS) that operates to reduce hydraulic pressure in the vehicle brake cylinders if the vehicle wheels lock-up and/or otherwise cease rotating during a braking event. These known systems include components such as a wheel speed sensor, a valve, a pump, a controller, etc. A wheel speed sensor measures a rotational speed of a tone ring and a vehicle wheel speed can be determined based on the measured rotational speed.

SUMMARY

An example apparatus disclosed herein includes an axle of a vehicle, and a tone ring coupled to the axle, the tone ring having teeth distributed about a peripheral edge of the tone ring, each tooth having a ramp-shaped surface to be sensed by a wheel speed sensor as the tone ring rotates with the axle.

Another example apparatus disclosed herein includes a tone ring to be coupled to an axle of a vehicle, the tone ring having a central bore to be received by the axle to couple the tone ring to the axle, wherein the tone ring has protrusions surrounding a peripheral edge of the tone ring, each protrusion having a beveled face to pass adjacent a sensor when the tone ring rotates.

Yet another example apparatus disclosed herein includes an axle of a vehicle, a tone ring coupled to the axle, the tone ring having teeth on a peripheral edge of the tone ring, each tooth having a ramp-shaped surface, and a sensor positioned to measure a wheel speed of the vehicle in response to the ramp-shaped surfaces passing by the sensor as the tone ring rotates with the axle.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

2
DETAILED DESCRIPTION

Disclosed herein are example tone ring apparatus for use in a package-constrained environment to measure a wheel speed of a vehicle. Tone rings are responsible for emulating a rotation of a vehicle wheel. A wheel speed sensor measures a rotational speed of a tone ring to determine a vehicle wheel speed. Typical vehicle systems use a tone ring having rectangularly-shaped teeth. To ensure an accurate wheel speed measurement, the wheel speed sensor is mounted so that a sensing face of the sensor is parallel to an end or side surface of the teeth. However, this configuration results in the wheel speed sensor consuming valuable space within a wheel hub assembly.

Traditionally, wheel speed sensors and tone rings have been mounted inside of a wheel hub via a bracket. However, due to increasingly complex vehicle assemblies being implemented, wheel hub assemblies are prone to space limitations. For example, a wheel hub assembly may include a parking brake (e.g., a drum-in-hat parking brake), a tone ring, a wheel speed sensor (e.g., a magnetic pickup), etc. Such wheel hub sub-assemblies may interfere mechanically with one another and, additionally, can cause problems during manufacturing and/or assembly of a vehicle axle.

In examples disclosed herein, a tone ring is coupled to an axle of a vehicle. The tone ring may have teeth distributed about a peripheral edge of the tone ring, each tooth having a ramp-shaped surface to be sensed by a wheel speed sensor as the tone ring rotates with the axle. In such disclosed examples, the axle includes a shoulder and the tone ring is coupled to the axle via a press-fit on the shoulder. In some disclosed examples, a portion of the tone ring is bent to conform to an angled edge of the axle. In some disclosed examples, a sleeve is coupled to the axle and the tone ring is dimensioned to be press-fitted onto the axle until contact is made with the sleeve. In some disclosed examples, the tone ring is coated with a metallic material. In some disclosed examples, the ramp-shaped surface of each tooth is angled with respect to a rotational axis of the tone ring within a range of 30 degrees to 60 degrees within a tolerance (e.g., a tolerance of 1 degree, 5 degrees, etc.). In some disclosed examples, the wheel speed sensor is disposed in a recess in a steering knuckle.

In some disclosed examples, a tone ring is to be coupled to an axle of a vehicle. In these examples, the tone ring may have a central bore to be received by the axle to couple the tone ring to the axle. In such disclosed examples, the tone ring has protrusions surrounding a peripheral edge of the tone ring, each protrusion having a beveled face to pass adjacent a sensor when the tone ring rotates.

In some disclosed examples, a tone ring is coupled to an axle of a vehicle, the tone ring having teeth on a peripheral edge of the tone ring, each tooth having a ramp-shaped surface. In such disclosed examples, a sensor is positioned to measure a wheel speed of the vehicle in response to the ramp-shaped surfaces passing by the sensor as the tone ring rotates with the axle.

As will be discussed in greater detail below in accordance with the teachings of this disclosure, the disclosed tone ring examples can have various configurations and/or orientations. In examples disclosed herein, such configurations and/or orientations can be altered or changed to optimize at least one of packaging and manufacturing of an axle assembly and/or the accuracy of a reading of a wheel speed of a vehicle based on a rotation of the disclosed tone ring examples. In some disclosed examples, the teachings of this disclosure are implemented on a rear wheel steer solid axle system of a vehicle. Alternatively, in other examples, the teachings of this disclosure can be implemented on front wheel steer axle systems, four-wheel steer axle systems, all-wheel steer axle systems, etc.

Figure 1:
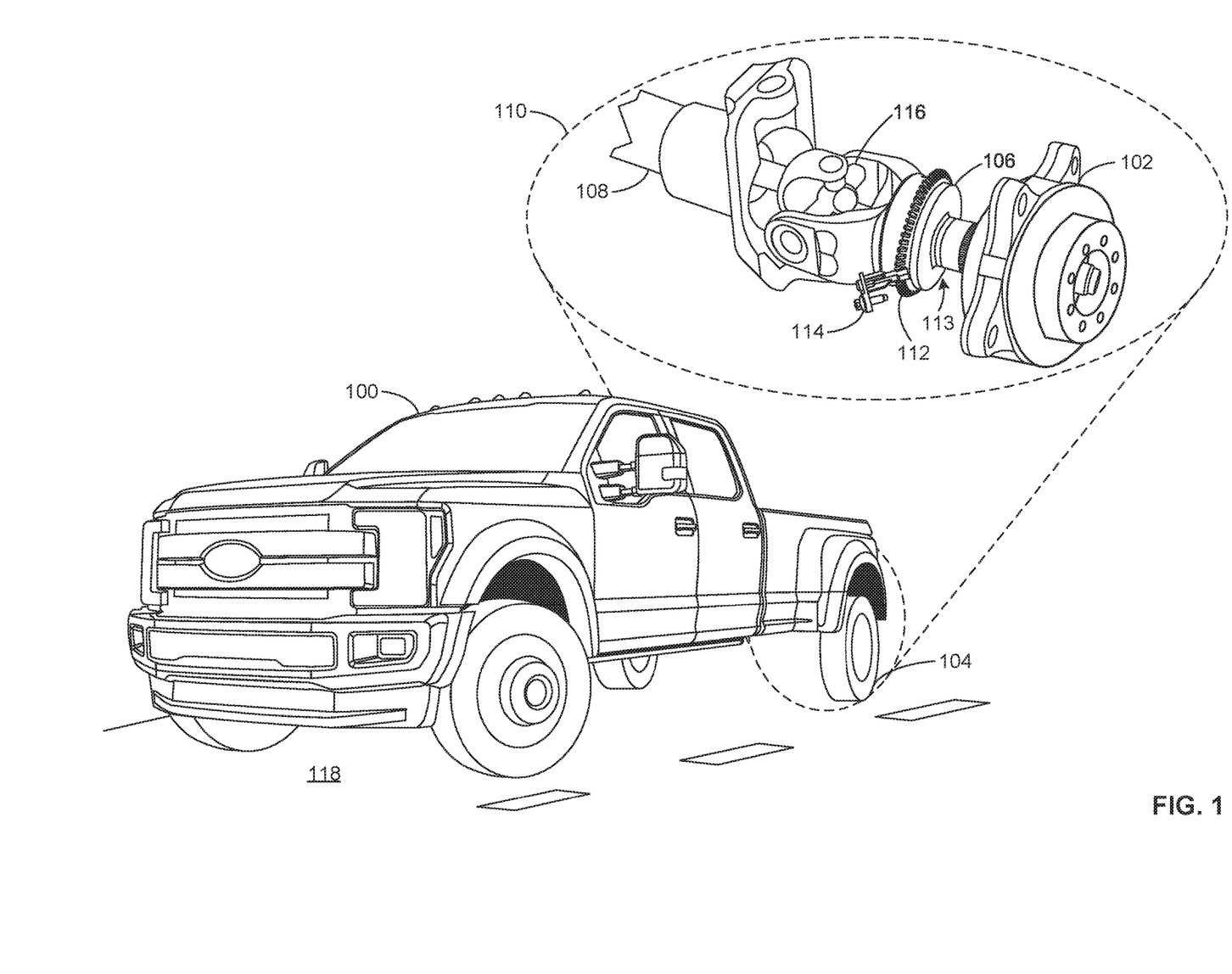
FIG. 1 depicts an example vehicle including an example rear wheel steer solid axle system including a first example tone ring.

FIG. 1 is a schematic illustration of an example vehicle 100 that may implement the teachings of this disclosure. In the illustrated example, the vehicle 100 is a truck. Alternatively, the example vehicle 100 may be a car, a bus, etc., having one or more wheel hub assemblies. In the illustrated example, the vehicle 100 includes four wheel hub assemblies 102 and four vehicle wheels 104. Alternatively, in other examples, the vehicle 100 may include fewer or additional wheel hub assemblies 102 and/or vehicle wheels 104. In particular, each of the wheel hub assemblies 102 is rotatably coupled to an axle stub shaft 106. In the illustrated example, the axle stub shaft 106 is rotatably coupled to a rear wheel steer solid axle 108 of a rear wheel steer solid axle system 110. The vehicle 100 of the illustrated example includes a tone ring 112 coupled to the axle stub shaft 106 to rotate with the axle stub shaft 106. The tone ring 112 has a central bore 113 to be received by the axle stub shaft 106 to couple the tone ring 112 to the axle stub shaft 106. In the illustrated example, a wheel speed sensor 114 is positioned relative to the tone ring 112. The wheel speed sensor 114 of the illustrated example is a magnetic pickup. Alternatively, the example wheel speed sensor 114 may be a camera, an encoder, a Hall effect sensor, a magnetic inductive sensor, a magnetoresistance sensor, an optical sensor, a potentiometer, a variable reluctance sensor, etc. The relative positioning of the example wheel speed sensor 114 and the tone ring 112 is further described below in connection with FIG. 2.

In the illustrated example, the axle stub shaft 106 is rotatably coupled to the rear wheel steer solid axle 108 via a universal joint (U-joint) 116. The U-joint 116 of the illustrated example is an articulable joint that is rotatably coupled to both the rear wheel steer solid axle 108 and the axle stub shaft 106. Alternatively, the example U-joint 116 may be replaced with and/or added to a ball joint, an axial joint, a constant velocity joint, etc., and/or a combination thereof.

As the example vehicle 100 drives on an example road surface 118, the vehicle 100 encounters imperfections in the road surface 118. The rear wheel steer solid axle 108 and the axle stub shaft 106 of the illustrated example are rigid and inflexible. In response to encountering the imperfections, the U-joint 116 allows the rear wheel steer solid axle 108 and the axle stub shaft 106 to move up and down with the example vehicle 100 as needed while incurring minimal stress.

Figure 2:
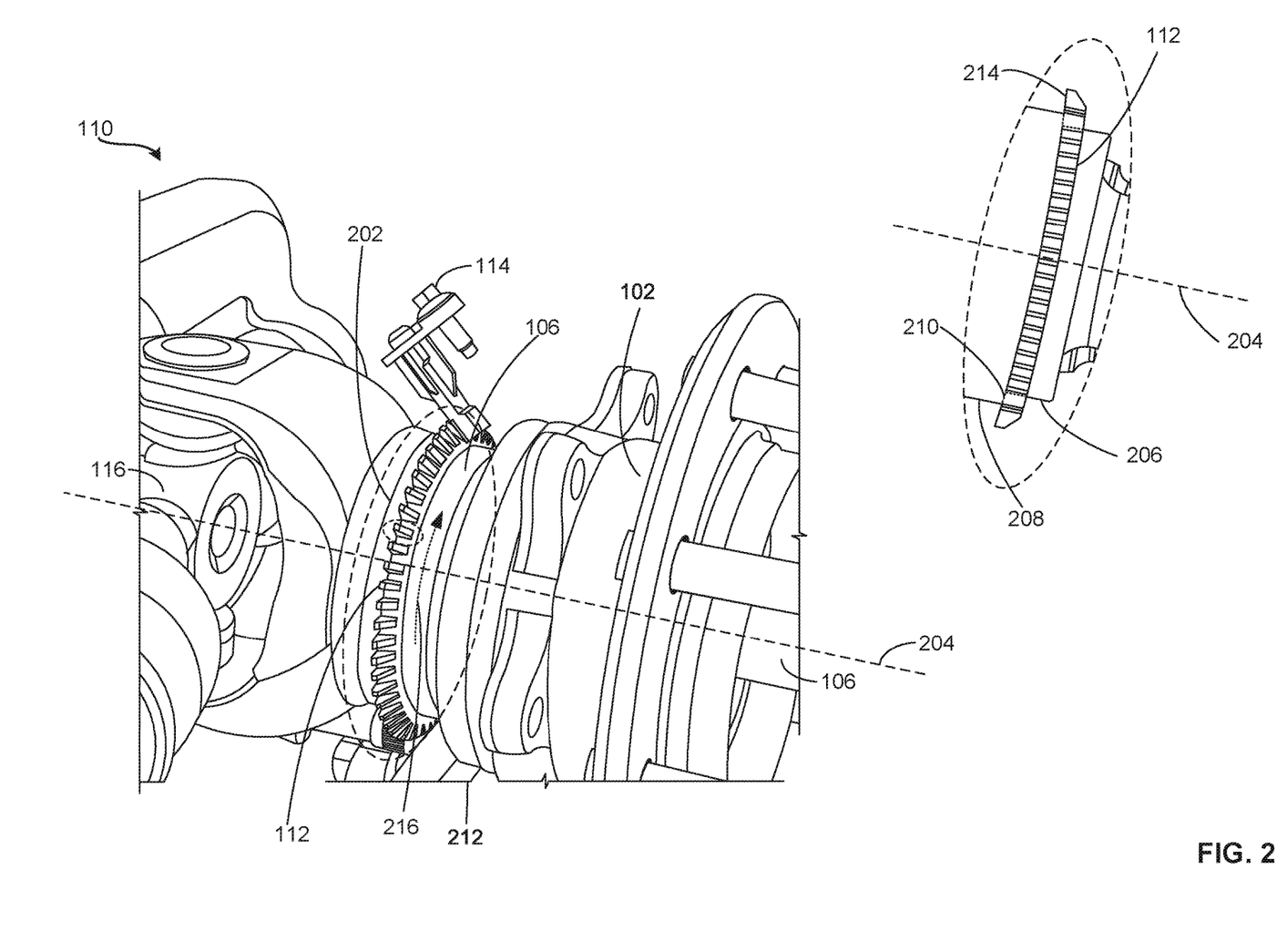
FIG. 2 is an isometric view of the example rear wheel steer solid axle system of FIG. 1 in accordance with the teachings of this disclosure.

FIG. 2 is an isometric view of the example rear wheel steer solid axle system 110 of FIG. 1 in accordance with the teachings of this disclosure. In the illustrated example, the axle stub shaft 106 includes a circumferential shoulder 202 that is machined, forged, and/or otherwise formed into an outer surface of the axle stub shaft 106. Alternatively, the example shoulder 202 may be incorporated into the example axle stub shaft 106 by milling, rolling, stamping, welding, etc. Alternatively, the example shoulder 202 may be a separate part such as a machined collar that is press-fitted onto the axle stub shaft 106. In the illustrated example, the shoulder 202 has a first diameter, while the axle stub shaft 106 has a second diameter smaller than the first diameter.

In the illustrated example, the tone ring 112 includes teeth 212 (e.g., protrusions) distributed about a peripheral edge 214 of the tone ring 112. Each tooth 212 of the example tone ring 112 has equal spacing (e.g., a gap) between adjacent teeth 212. Alternatively, in other examples, different spacings between adjacent teeth 212 may be used. For example, a first spacing between a first one of the teeth 212 and a second one of the teeth 212 on a first side of the first one may be greater than a second spacing between the first one and a third one of the teeth 212 on a second side of the first one. The tone ring 112 rotates about the axis 204 in an example rotational direction 216.

In the illustrated example, the tone ring 112 includes teeth 212 (e.g., protrusions) distributed about a peripheral edge 214 of the tone ring 112. Each tooth 212 of the example tone ring 112 has equal spacing (e.g., a gap) between adjacent teeth 212. Alternatively, in other examples, different spacings between adjacent teeth 212 may be used. For example, a first spacing between a first one of the teeth 212 and a second one of the teeth 212 on a first side of the first one may be greater than a second spacing between the first one and a third one of the teeth 212 on a second side of the first one.

Figure 3:
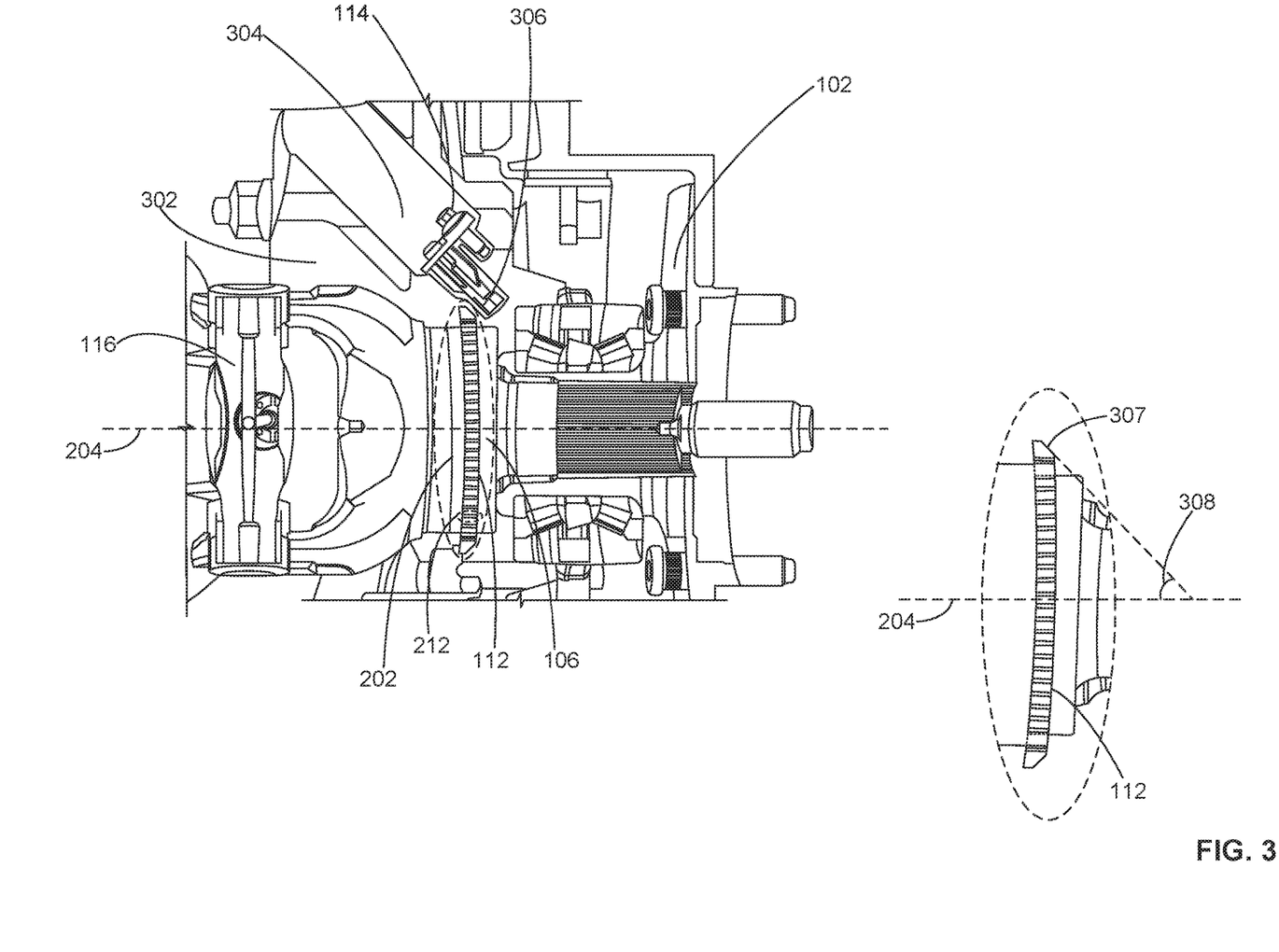
FIG. 3 is a partial cross-sectional view of the example wheel hub assembly of FIGS. 1-2.

FIG. 3 is a partial cross-sectional view of the example wheel hub assembly 102 of FIGS. 1-2. The wheel hub assembly 102 of the illustrated example is coupled to an example steering knuckle 302. The steering knuckle 302 includes an example steering knuckle recess 304. The wheel speed sensor 114 is disposed in the steering knuckle recess 304. In the illustrated example, the steering knuckle recess 304 is a countersunk hole. Alternatively, the example steering knuckle recess 304 may be a porthole, a counterbore hole, etc. In the illustrated example, the wheel speed sensor 114 includes a sensing face 306 to measure a wheel speed of the vehicle 100 based on a rotational speed of the tone ring 112. In the illustrated example, each tooth 212 has a ramp-shaped surface (e.g., a beveled face) to be sensed by the wheel speed sensor 114. For example, a ramp-shaped surface 307 of each tooth 212 of the tone ring 112 is oriented at an angle 308 between 30 degrees and 60 degrees within a tolerance (e.g., a tolerance of 1 degree, 5 degrees, etc.) with respect to the rotational axis 204. Alternatively, in other examples, the ramp-shaped surface of each tooth 212 of the tone ring 112 may be angled with respect to a vertical axis, a normal axis, etc., of the tone ring 112. In the illustrated example, the sensing face 306 of the wheel speed sensor 114 is parallel to each of the ramp-shaped surfaces 307 of the teeth 212. The sensing face 306 of the illustrated example does not contact the teeth 212. In particular, the sensing face 306 is positioned between 1 mm and 2 mm away from the example teeth 212 to ensure an accurate reading of a wheel speed of an example vehicle 100. As the tone ring 112 rotates, the teeth 212 rotate with respect to and, then, move across the sensing face 306 of the wheel speed sensor 114.

In some examples, exterior surfaces of the tone ring 112 and the teeth 212 may be coated with a metallic material. Alternatively, in other examples, the tone ring 112 and the teeth 212 may be composed of a metallic material. The sensing face 306 of the illustrated example includes a magnet. A magnetic field of the magnet changes as each of the teeth 212 passes the sensing face 306 of the wheel speed sensor 114, creating a time varying signal. The signal varies in strength and frequency based on a rotational speed of the tone ring 112, thereby enabling the wheel speed sensor 114 to measure a wheel speed of the example vehicle 100.

Figure 4:
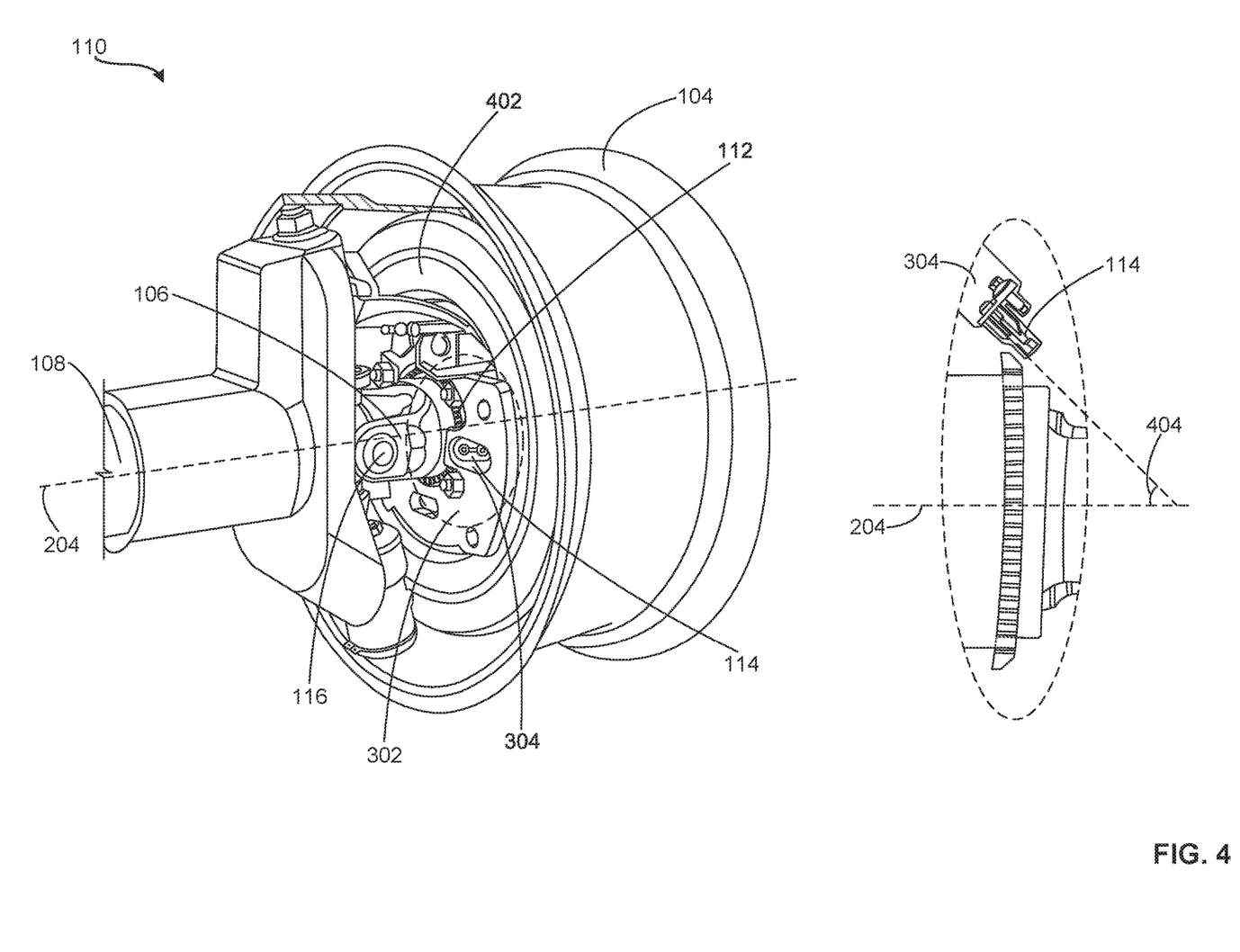
FIG. 4 is another isometric view of the example rear wheel steer solid axle system of FIGS. 1-2.

FIG. 4 is another isometric view of the example rear wheel steer solid axle system 110 of FIG. 1-2. In the illustrated example, a parking brake 402 is included in the vehicle wheel 104 of FIG. 1. The parking brake 402 of the illustrated example is a drum-in-hat parking brake. Alternatively, the parking brake 402 may be a disc brake parking brake, a ball and ramp parking brake, etc. In the illustrated example, the wheel speed sensor 114 is disposed in the steering knuckle recess 304 at an angle 404 between 30 degrees and 60 degrees within a tolerance (e.g., a tolerance of 1 degree, 5 degrees, etc.) with respect to the rotational axis 204. The wheel speed sensor 114 is disposed in the steering knuckle recess 304 at the angle 404 as to accommodate the location of the parking brake 402. For example, when the parking brake 402 is integrated into the wheel hub assembly 102, the examples described herein enable the components of the assembly (e.g., a wheel speed sensor) to be relocated and/or positioned at an angle to overcome space limitations of the wheel hub assembly 102.

Figure 5:
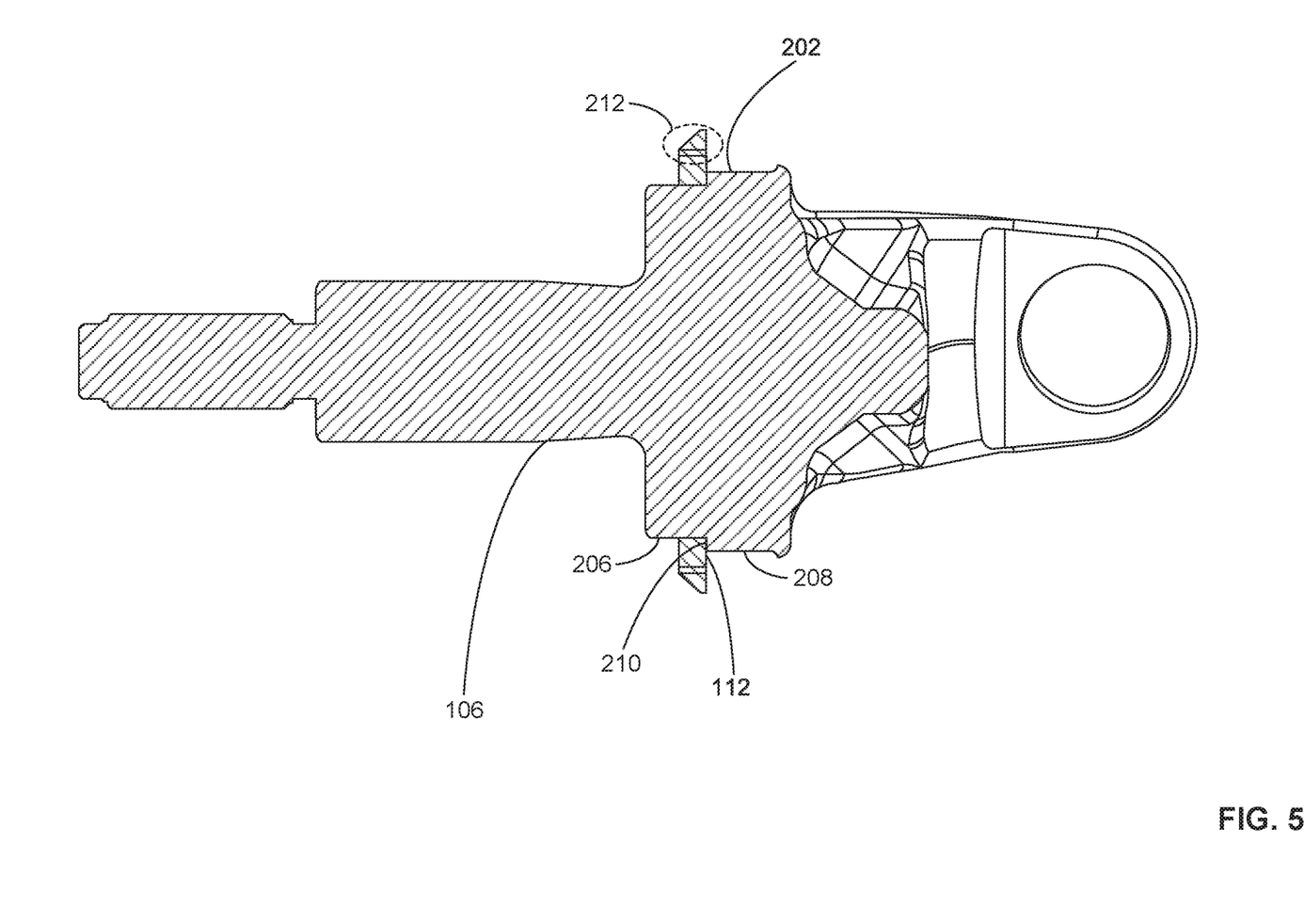
FIG. 5 is a cross-sectional view of the first example tone ring coupled to the axle stub shaft of FIGS. 1-4.

FIG. 5 is a cross-sectional view of the example tone ring 112 coupled to the axle stub shaft 106 of FIGS. 1-4. In the illustrated example, the tone ring 112 is coupled to the axle stub shaft 106 via a press-fit on the shoulder 202. Alternatively, the example tone ring 112 may be coupled to the axle stub shaft 106 via threads, a weld, etc.

Figure 6:
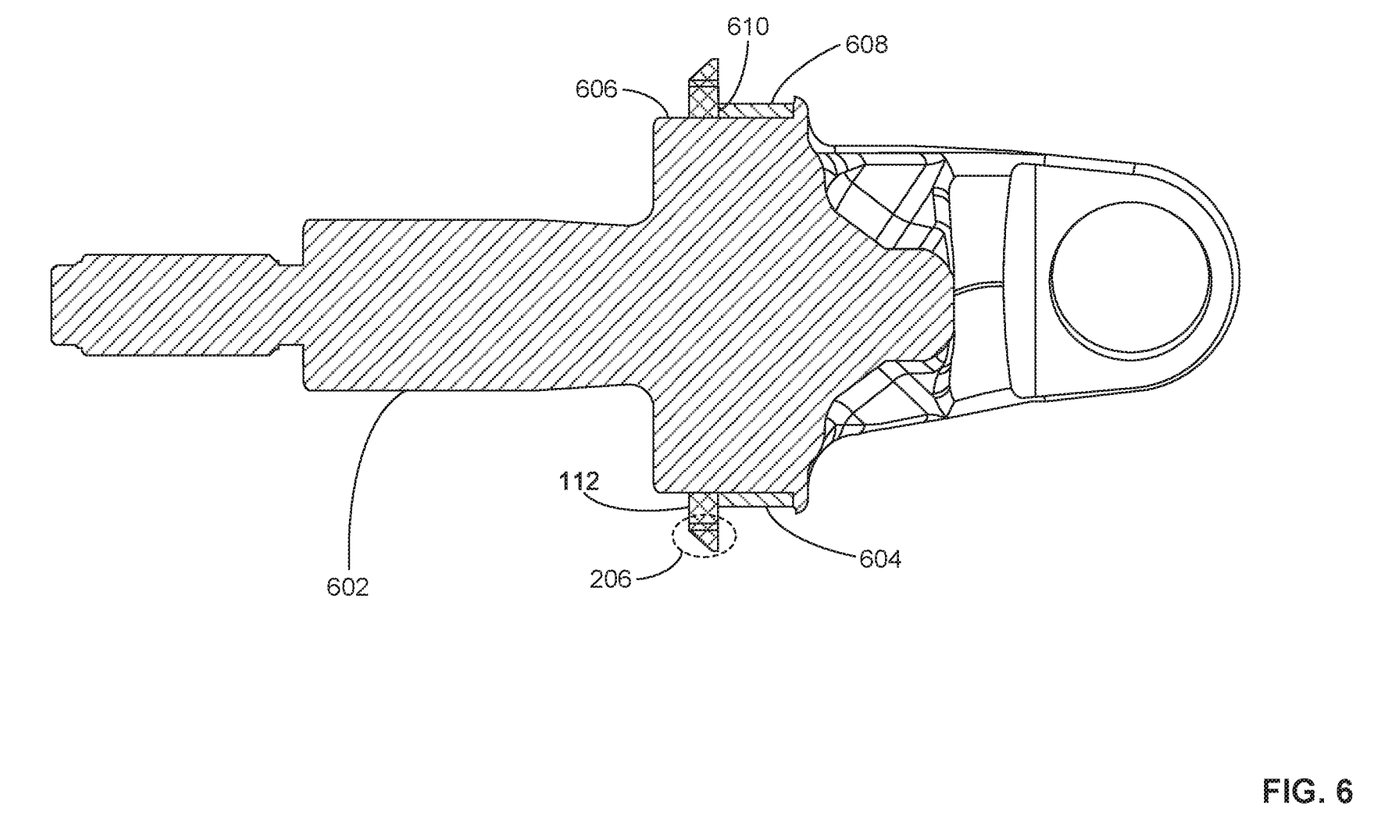
FIG. 6 is a cross-sectional view of the first example tone ring of FIG. 5 coupled to a second example axle stub shaft.

FIG. 6 is a cross-sectional view of the example tone ring 112 of FIGS. 1-5 coupled to another example axle stub shaft 602. In the illustrated example, a sleeve (e.g., a machined sleeve) 604 is coupled to the axle stub shaft 602 via a press-fit. Alternatively, the example sleeve 604 may be a hollow, plastic shaft, a rubber bushing, etc. In the illustrated example, the tone ring 112 is press-fitted onto the axle stub shaft 602 until contact is made with the sleeve 604. In some examples, the sleeve 604 creates a raised or first surface 608 from an outer or second surface 606 of the axle stub shaft 602. As shown, the sleeve 604 also provides an abutment or third surface 610 that is substantially perpendicular to and connecting the first surface 608 and second surface 606. In the same example, the tone ring 112 is press-fitted onto the first surface 608 of the axle stub shaft 602 until contact is made with the third surface 610 of the sleeve 604.

Figure 7:
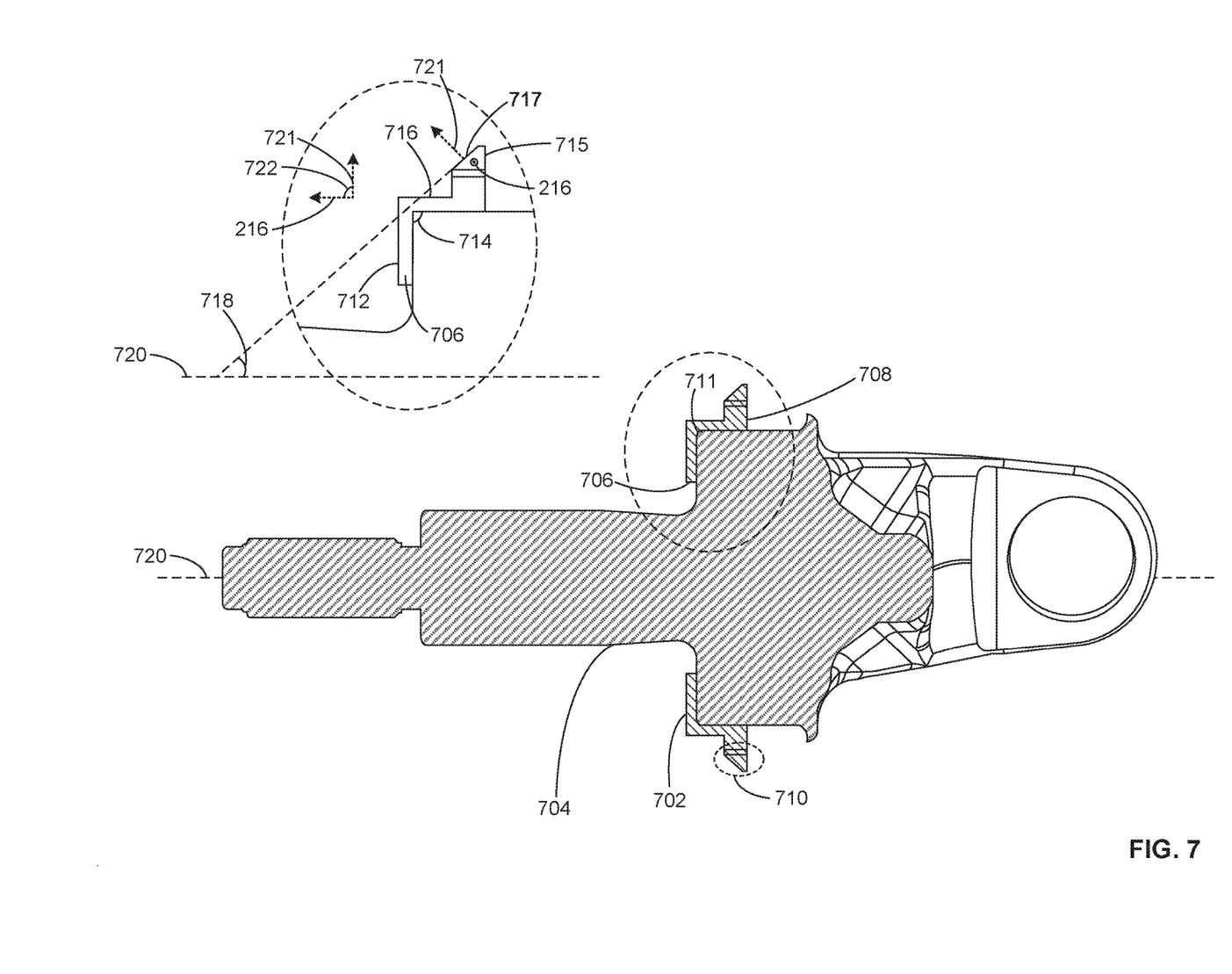
FIG. 7 is a cross-sectional view of a second example tone ring coupled to a third example axle stub shaft.

FIG. 7 is a cross-sectional view of another example tone ring 702 coupled to yet another example axle stub shaft 704 via a press-fit. Alternatively, the example tone ring 702 may be coupled to the example axle stub shaft 704 via threads, a weld, etc. After the tone ring 702 of the illustrated example is coupled to the axle stub shaft 704, a first side 706 of the tone ring 702 opposite a second side 708 including a plurality of teeth 710 is bent to conform to an angled edge 711 of the axle stub shaft 704. When bent, the first side 706 forms a first surface 712 at an angle 714 relative to a second surface 716. In the illustrated example, the first surface 712 is substantially perpendicular to the second surface 716. Alternatively, in other examples, the first surface 712 may be angled (e.g., not substantially parallel) to the second surface 716.

In the illustrated example, the tone ring 702 includes the teeth 710 (e.g., protrusions) distributed about a peripheral edge 715 of the tone ring 702. In the illustrated example, each tooth 710 has a ramp-shaped surface 717 (e.g., a beveled face). In some examples, the ramp-shaped surface 717 of each tooth 710 of the tone ring 702 is oriented at an angle 718 between 30 degrees and 60 degrees within a tolerance (e.g., a tolerance of 1 degree, 5 degrees, etc.) with respect to a rotational axis 720. In connection with the illustrated example of FIG. 7, the structure, function, and/or operation of each of the teeth 710 is the same as the corresponding structure, function, and/or operation of the teeth 212 of FIGS. 2, 3, 5, and 6 described above. Thus, in the interest of brevity, the structure, function, and/or operation of these components, structures, operations, etc., are not repeated herein.

In the illustrated example, the tone ring 702 includes the teeth 710 (e.g., protrusions) distributed about a peripheral edge 715 of the tone ring 702. In the illustrated example, each tooth 710 has a ramp-shaped surface 717 (e.g., a beveled face). The ramp-shaped surface 717 faces in a direction defined by an example vector 721, which is normal to the surface of the ramp-shaped surface 717. In the illustrated example of FIG. 7, the vector 721 is orientated perpendicularly to the rotational direction 216 of the tone ring 216. In some examples, the ramp-shaped surface 717 of each tooth 710 of the tone ring 702 is oriented at an angle 718 between 30 degrees and 60 degrees within a tolerance (e.g., a tolerance of 1 degree, 5 degrees, etc.) with respect to a rotational axis 720. In connection with the illustrated example of FIG. 7, the structure, function, and/or operation of each of the teeth 710 is the same as the corresponding structure, function, and/or operation of the teeth 212 of FIGS. 2, 3, 5, and 6 described above. Thus, in the interest of brevity, the structure, function, and/or operation of these components, structures, operations, etc., are not repeated herein.

Although certain example apparatus have been disclosed herein, the scope of coverage of this patent is not limited thereto. On the contrary, this patent covers all apparatus fairly falling within the scope of the claims of this patent.

What is claimed is:

1. An apparatus comprising:
    an axle of a vehicle; and
    a tone ring coupled to the axle, the tone ring having teeth distributed about a peripheral edge of the tone ring, each tooth having a ramp-shaped surface to be sensed by a wheel speed sensor as the tone ring rotates with the axle, the ramp-shaped surface angled relative to a rotational axis of the axle and facing in a direction perpendicular to a direction of travel of the teeth of the tone ring.

2. The apparatus of claim 1, wherein the axle includes a shoulder and the tone ring is coupled to the axle via a press-fit on the shoulder.

3. The apparatus of claim 1, wherein a portion of the tone ring is bent to conform to an angled edge of the axle.

4. The apparatus of claim 1 further including a sleeve coupled to the axle and wherein the tone ring is press-fitted onto the axle until contact s made with the sleeve.

5. The apparatus of claim 1, wherein the ramp-shaped surface of each tooth is angled with respect to the rotational axis of the tone ring within a range of 30 degrees to 60 degrees.

6. The apparatus of claim 1 further including the wheel speed sensor disposed in a recess of a steering knuckle.

7. The apparatus of claim 1, wherein the ramp-shaped surface is parallel to a sensing face of the wheel speed sensor.

8. An apparatus comprising
    a tone ring to be coupled to an axle of a vehicle, the tone ring having a central bore to be received by the axle to couple the tone ring to the axle, wherein the tone ring has protrusions surrounding a peripheral edge of the tone ring, the protrusions having beveled faces to pass adjacent a sensor when the tone ring rotates, the beveled faces angled relative to a rotational axis of the axle and facing in a direction perpendicular to a direction of travel of the protrusions of the tone ring.

9. The apparatus of claim 8, wherein the tone ring is dimensioned to be coupled to the axle via a press-fit on a shoulder of the axle.

10. The apparatus of claim 8, wherein a portion of the tone ring is bendable to conform to an angled edge of the axle.

11. The apparatus of claim 8 further including a sleeve to be coupled to the axle and wherein the tone ring is dimensioned to be press-fitted onto the axle until contact is made with the sleeve.

12. The apparatus of claim 8; wherein an exterior surface of the tone ring is coated with a metallic material.

13. The apparatus of claim 8, wherein the beveled faces are angled with respect to the rotational axis of the tone ring within a range of 30 degrees to 60 degrees.

14. The apparatus of claim 8 further including the sensor disposed in a recess of a steering knuckle.

15. An apparatus comprising:
   an axle of a vehicle;
   a tone ring coupled to the axle, the tone ring having teeth on a peripheral edge of the tone ring, each tooth having a ramp-shaped surface angled relative to a rotational axis of the axle and facing in a direction perpendicular to a direction of travel of the teeth of the tone ring; and
   a sensor positioned to measure a wheel speed of the vehicle in response to the ramp-shaped surfaces passing by the sensor as the tone ring rotates with the axle.

16. The apparatus of claim 15, wherein the axle includes a shoulder and the tone ring is coupled to the axle via a press-fit on the shoulder.

17. The apparatus of claim 15, wherein a portion of the tone ring is bent to conform to an angled edge of the axle.

18. The apparatus of claim 15 further including a sleeve coupled to the axle and wherein the tone ring is press-fitted onto the axle until contact is made with the sleeve.

19. The apparatus of claim 15, wherein an exterior surface of the tone ring is coated with a metallic material.

20. The apparatus of claim 15, wherein each ramp-shaped surface is angled with respect to the rotational axis of the tone ring within a range of 30 degrees to 60 degrees.

\* \* \* \* \*